(12) United States Patent
Harding et al.

(10) Patent No.: US 7,844,027 B2
(45) Date of Patent: Nov. 30, 2010

(54) XRD-BASED FALSE ALARM RESOLUTION IN MEGAVOLTAGE COMPUTED TOMOGRAPHY SYSTEMS

(75) Inventors: Geoffrey Harding, Hamburg (DE); Joseph Bendahan, San Jose, CA (US)

(73) Assignee: Morpho Detection, Inc., Newark, CA (US)

( * ) Notice: Subject to any disclaimer, the term of this patent is extended or adjusted under 35 U.S.C. 154(b) by 0 days.

(21) Appl. No.: 12/366,844

(22) Filed: Feb. 6, 2009

(65) Prior Publication Data

US 2009/0323889 A1 Dec. 31, 2009

Related U.S. Application Data

(60) Provisional application No. 61/030,593, filed on Feb. 22, 2008.

(51) Int. Cl.
 *G01N 23/00* (2006.01)
 *G01N 23/04* (2006.01)
(52) U.S. Cl. .................. 378/9; 378/20; 378/57
(58) Field of Classification Search ...... 378/4, 378/9, 57, 19, 20, 70, 68, 79, 62, 208
See application file for complete search history.

(56) References Cited

U.S. PATENT DOCUMENTS

| | | | |
|---|---|---|---|
| 4,096,389 A | 6/1978 | Ashe et al. | |
| 7,366,281 B2 | 4/2008 | Skatter | |
| 7,492,862 B2 | 2/2009 | Bendahan | |
| 7,590,220 B1 | 9/2009 | Lee et al. | |
| 2008/0260093 A1* | 10/2008 | Bontus | 378/9 |
| 2009/0003514 A1 | 1/2009 | Edic et al. | |
| 2009/0213989 A1 | 8/2009 | Harding | |

\* cited by examiner

*Primary Examiner*—Irakli Kiknadze
(74) *Attorney, Agent, or Firm*—Armstrong Teasdale LLP

(57) ABSTRACT

System and method for XRD-based false alarm resolution in computed tomography ("CT") threat detection systems. Following a scan of an object with a megavoltage CT-based threat detection system, a suspicious area in the object is identified. The three dimensional position of the suspicious area is used to determine a ray path for the XRD-based threat detection system that provides minimal X-ray attenuation. The object is then positioned for XRD scanning of the suspicious area along this determined ray path. The XRD-based threat detection system is configured to detect high density metals ("HDMs) as well as shielded Special Nuclear Materials ("SNMs") based on cubic or non-cubic diffraction profiles.

20 Claims, 9 Drawing Sheets

XRD-BASED FALSE ALARM RESOLUTION IN MEGAVOLTAGE COMPUTED TOMOGRAPHY SYSTEMS

CROSS-REFERENCE TO RELATED APPLICATIONS

This application claims priority to U.S. provisional patent application entitled, XRD-BASED FALSE ALARM RESOLUTION IN MEGAVOLTAGE COMPUTED TOMOGRAPHY SYSTEMS, filed Feb. 22, 2008, having a Ser. No. 61/030,593, the disclosure of which is hereby incorporated by reference in its entirety.

BACKGROUND

1. Field of the Invention

The field of the invention relates to computed tomography ("CT")-based threat detection systems generally, and more particularly to certain new and useful advances in using X-ray Diffraction ("XRD") to resolve false alarms generated by a megavoltage CT threat detection system, of which the following is a specification, reference being had to the drawings accompanying and forming a part of the same.

2. Discussion of Related Art

Megavoltage CT is used for inspection and screening of shipping containers, as it provides a high-resolution, 3-D data set of the density and approximate atomic number distribution inside the container. That said, Megavoltage CT is not material-specific. Rather it can generate a significant number of false alarms for some cargo categories. Some of these alarms can be cleared employing On-Screen Alarm ("OSAR") protocols. Others, however, need to be cleared by a secondary technique, or, in a worst-case scenario, the containers that generate an alarm must be manually inspected. It is desirable to avoid employing a secondary technique or manual inspection because both operations are extremely costly.

XRD is a material-specific analysis technique that permits the local diffraction properties of a selected volume element (voxel) of an extended object (e.g. a suitcase, a piece of passenger baggage, a shipping container, and the like) to be determined. The idea of operating an XRD system as a second inspection modality that follows a first CT investigation to reduce the false alarm rate in airport baggage screening has been generically outlined in the scientific literature. But the mere mention of this idea left many problems unsolved.

One such problem is whether and how materials such as, for example, high density metals ("HDMS") and shielded special nuclear materials ("SNMs"), that are present in the extended objects are detected with a CT-based threat detection system in combination with an XRD-based threat detection system. Another problem is how to optimize an XRD threat detection system to minimize its total X-ray attenuation. Still another problem is how to permit simultaneous XRD imaging from a one-dimensional array of object voxels.

Accordingly, an improved threat detection system is needed that detects HDMS and shielded SNMs, that minimizes or eliminates false alarms, and that determines a minimum attenuation path through an extended object. An improved secondary collimator is also needed that enables simultaneous XRD imaging from a one-dimensional array of object voxels.

SUMMARY

The subject matter described, shown, and claimed herein is believed to be novel and inventive in that it overcomes many of the drawbacks and disadvantages associated with threat detection systems that are known in the art. It provides unique solutions that address at least the problems and the long-felt needs identified above. It also offers detection synergy because it provides for a single improved threat detection system that can be configured to detect both SNMs and conventional explosives, such as, for example, organic, homemade explosives ("HMEs"), and liquids.

In developing the subject matter described, shown, and claimed herein, it was discovered that high density metals ("HDMs"), also called "high-Z metals," where "Z" is a material's atomic number, have cubic crystalline structures, and that X-ray diffraction can be used to preferentially select high-Z metals through the atomic $Z^2$ coherent scatter intensity effect. It was also discovered that special nuclear materials ("SNMs"), a special subset of HDMs, have non-cubic lattice structures that facilitate rapid, accurate, and material-specific XRD-based differentiation. Examples of SNMs include uranium and plutonium.

Additionally, the three-dimensional ("3-D") data obtained by first scanning an extended object with a CT-based threat detection system can be used to determine a minimum X-ray attenuation path through the object. Advantageously, this minimum X-ray attenuation path can thereafter be used to obtain an accurate XRD measurement of a diffraction profile of an alarm region previously identified by the Megavolt CT-based threat detection system. Accordingly, an XRD-based threat detection system, and method of operating the same, are disclosed herein as being configured to use a previously determined minimal X-ray attenuation path to detect HDMs generally, and shielded SNMs in particular, with minimal or no false alarms.

It was also discovered that an improved secondary collimator can be constructed by including therein a continuous spiral slit aperture. The continuous spiral slit aperture provides a multi-angle capability that significantly extends the range of momenta for which XRD intensities are measured for a given range of photon intensities. Such an improved secondary collimator enables simultaneous XRD imaging from a one-dimensional array of object voxels. This is advantageous because the simultaneous XRD imaging requires only the high-energy end of a source spectrum.

Moreover, XRD intensity profiles over a limited energy range can be super-imposed on one another to derive an XRD intensity profile over an extended momentum range. Using the improved secondary collimator having the continuous spiral secondary aperture allows an XRD-based threat detection system having multiple X-ray detectors to resolve multiple alarms simultaneously, which were previously identified by a CT-based threat detection system. These two innovations, alone or in combination, lead to a higher signal-to-noise ratio in the XRD profile that increases the detection rate and reduces the false alarm rate.

It was further discovered that an XRD-based threat detection system having multiple X-ray detectors has a significant advantage over XRD-based threat detection systems that have only a single X-ray detector. To resolve multiple alarms using a single detector XRD-based threat detection system, the single detector must be moved multiple times—each time to a position that corresponds to a particular alarm. In contrast, a multiple detector XRD-based threat detection system equipped with the improved secondary collimator having a continuous spiral secondary aperture, can resolve multiple alarms simultaneously and while keeping each of the multiple X-ray detectors stationary.

Accordingly, an improved secondary collimator, a method of using the same, and a threat detection system including the same are described, shown, and claimed herein.

These and other aspects and advantages of the preferred embodiments of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and that, unless otherwise indicated, they are merely intended to conceptually illustrate the structures and procedures described herein.

BRIEF DESCRIPTION OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION

Specific configurations and arrangements of the claimed invention, discussed below with reference to the accompanying drawings, are for illustrative purposes only. Other configurations and arrangements that are within the purview of a skilled artisan can be made without departing from the spirit and scope of the appended claims.

CT-Based Threat Detection

Figure 1:
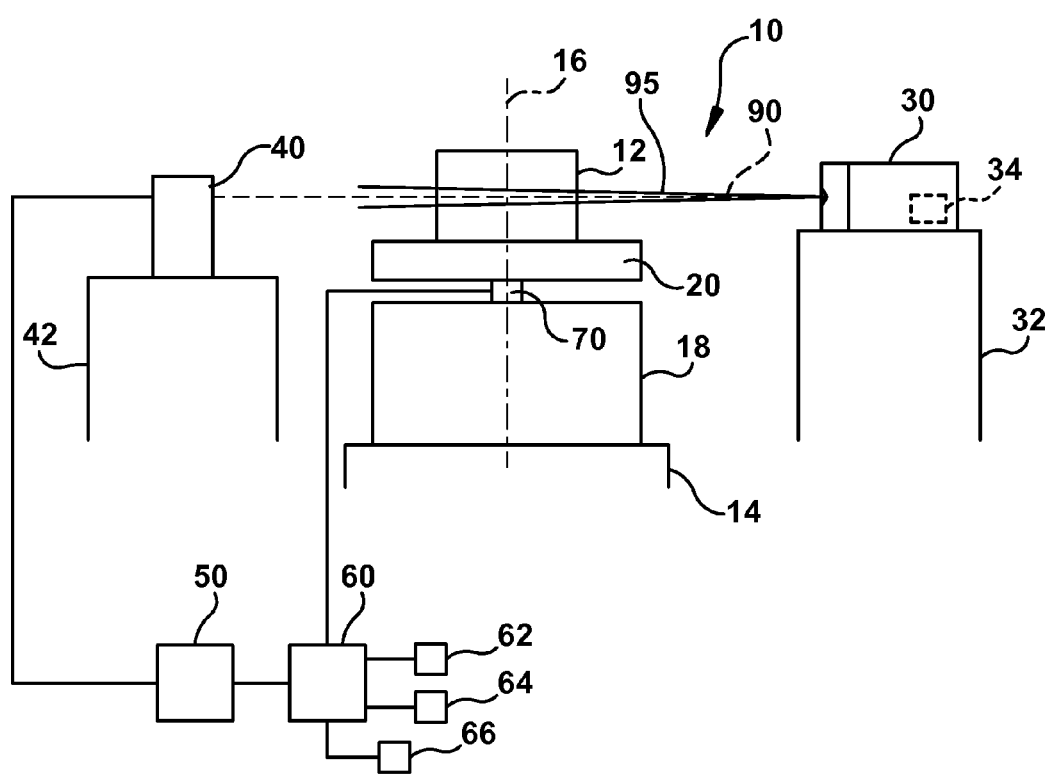
FIG. 1 is a schematic illustration of a first threat detection system, previously disclosed in related U.S. Pat. No. 7,492,862, filed on Jan. 17, 2007 as U.S. patent application Ser. No. 11/654,251.

FIG. 1 is a schematic illustration of a first threat detection system 10, which is configured to scan an object 12, such as a shipping container, a piece of baggage, and the like, to identify the contents of and/or determine a type of one or more materials contained in object 12.

In one embodiment, the first threat detection system 10 is a Megavolt CT-based threat detection system, such as that previously disclosed in related U.S. Pat. No. 7,492,862, filed on Jan. 17, 2007. However, any suitable CT-based threat detection system may be used.

The object 12 rests on a movable platform 20, which, together with the object 12, can be raised and lowered vertically along, and/or rotated about, a vertical axis 16 by an actuator 70, which is coupled with, or supported by, a frame 18. The actuator 70 may also be configured to move the movable platform 20, and the object 12, along a horizontal axis 90. A computer 60 may be coupled with the actuator 70 and configured to control the vertical, rotational, and/or horizontal movement of the platform 20 and the object 12 thereon. The actuator 70 may be any suitable drive assembly known to those skilled in the art and guided by the teachings herein provided.

A frame 32 may support at least one radiation source 30, which is configured to transmit at least one beam of radiation 95, such as a cone beam, through object 12, as described in greater detail below. In one embodiment, the radiation source 30 is an X-ray source, such as a Megavolt X-ray generator.

In one embodiment, a plurality of X-ray sources 30 are fixedly positioned with respect to platform 20 and configured to emit radiation of different energy distributions. Alternatively, each X-ray source 30 is configured to emit radiation of selective energy distributions, which can be emitted at different times.

An embodiment of the first threat detection system 10 may utilize multiple energy inspection to obtain an attenuation map for object 12. A dual energy system, for example, may include a first energy source, or low energy source, that generates radiation that has an energy distribution from about 2 MV to about 6 MV, and a second energy source, or high energy source, that generates radiation that has an energy distribution from about 6 MV to about 20 MV. Of course, it will be readily appreciated and apparent to those having ordinary skill in the art, and guided by the teachings herein provided that the first energy source may generate radiation having an energy distribution less than about 2 MV and/or greater than about 6 MV. Similarly, the second energy source may generate radiation having an energy distribution less than about 6 MV and/or greater than about 20 MV.

In addition to CT images, multiple-energy scanning can produce density maps and can identify the atomic number of the contents inside the object 12. This information improves the identification of the materials contained in object 12. This is beneficial, for example, because it allows, in one embodiment, for accurately distinguishing high-density tungsten from uranium.

In one embodiment of threat detection system 10, dual energy scanning of object 12 is used to inspect object 12 by scanning object 12 at the low energy and then scanning object 12 at the high-energy. The data is collected for the low-energy scan and the high-energy scan to reconstruct the CT image, the density image, and/or the atomic number image of object 12. As described in more detail below, these are used to identify the type of material or contraband in the object 12.

In an alternative embodiment of threat detection system 10, X-ray source 30 includes a linear accelerator 34 that produces radiation pulses of the same or varying energies. In this alternative embodiment, the linear accelerator 34 generates the low energy x-rays and the high energy x-rays in a high speed switching mode or interlaced mode such that object 12 is scanned only one time. This approach permits higher throughput. In another alternative embodiment, X-ray source 30 includes a suitable electrostatic accelerator, a microtron, a betatron, or any other type of X-ray source. Because these components are generally well-understood, only a brief description is provided herein, since a detailed description is not necessary. In still another alternative embodiment, object 12 is scanned with at least one energy distribution.

It is shown in FIG. 1 that threat detection system 10 further includes at least one X-ray detector 40 that is fixedly positioned with respect to frame 18 and/or platform 20. In one example, X-ray detector 40 is fixedly positioned with respect to a second side of frame 18 and/or platform 20 opposing the platform first side. In the present embodiment, X-ray detector 40 is mounted to a second tower 42 positioned with respect to base 14, as shown in FIG. 1. X-ray detector 40 is configured to detect radiation emitted from X-ray source 30 and transmitted through object 12. X-ray detector 40 can be configured to cover an entire field of view, or in alternative examples, to cover only a portion of the field of view. Upon detection of the transmitted radiation, X-ray detector 40 generates a signal representative of the detected transmitted radiation. The signal is transmitted to a data collection system 50 and/or the computer processor 60 for processing.

The first threat detection system 10 is configured to operate in a plurality of modes, including, but not limited to, a step-and-shoot mode and a helical mode. In the step-and-shoot mode, the radiation source 30 is fixedly positioned with respect to object 12 to be scanned. Thereafter, one or more of the radiation beams 95 is transmitted through the object 12 to impinge the detector 40. In alternative examples of the step-and-shoot mode, the object 12 may, or may not, be rotated during beam transmissions or between beam transmissions. In one example, object 12 is continuously rotated during the step-and-shot mode while the frame 18 remains stationary. Alternatively, in the helical mode, platform 20 is continuously rotated as frame 18 is moved along the vertical axis 16.

The first threat detection system 10 can obtain a large number of precise X-ray views that are suited to reconstruct a volumetric image of the object 12. The volumetric image is a mapping of the CT number for each volume element. In one example, the mapping of the CT number is done regardless of the superposition of objects or materials within object 12.

In certain implementations of the threat detection system 10, an imaging system (not shown) is coupled to X-ray detectors 40. Exemplary imaging systems are configured to process image data from the X-ray detectors 40 to produce a reconstructed image, such as, for example, a two-dimensional or three-dimensional map of the object 12 and its contents. In one example, the reconstructed images are processed to determine a CT number, density and/or atomic number of object 12 being scanned. These images are then analyzed to determine the type of materials that are contained in object 12.

Exemplary threat detection systems may include a variety of components that are suited to, among other things, process the image data and produce the reconstructed image. In the embodiment of FIG. 1, the threat detection system 10 also includes a data collection system 50 that is operatively coupled to and in signal communication with X-ray detector 40. The data collection system 50 is configured to receive the signals generated and transmitted by X-ray detector 40. Threat detection system 10 further includes a computer processor 60 that is operatively coupled to data collection system 50 and to the actuator 70. The system 10 also includes a display device 62, a memory device 64 and/or an input device 66 operatively coupled to data collection system 50 and/or processor 60.

In general, the computer processor 60 is configured to produce or generate an image of object 12 and its contents, and to process the image in a manner that facilitates determining what material(s) are in the object 12. Alternative embodiments of threat detection system 10 may include more than one processor 60 that are used to generate and/or process the image of the object 12. As used herein, the term "processor" is not limited to only integrated circuits referred to in the art as a processor, but broadly refers to a computer, a microprocessor, a microcontroller, a programmable logic controller, an application specific integrated circuit and any other programmable circuit. The term "processor" may also include a storage device and/or an input device, such as a mouse and/or a keyboard. Accordingly, the functionality and components of each of the display device 62, the memory device 64, and the input device 66 will be appreciated by those having ordinary skill in the art and, thus, no additional description or explanation is necessary.

During an exemplary operation of the threat detection system 10, as illustrated in the embodiment of FIG. 1, the data collection system 50 and/or the processor 60 may produce at least one attenuation map based upon the signals received from X-ray detector 40. Utilizing the attenuation map(s), at least one image of the contents is reconstructed and a CT number, a density and/or an atomic number of the contents is inferred from the reconstructed image(s). When data is collected using a single energy mode, the CT image is analyzed. When data is collected using a multiple energy mode, two or more CT images of the cargo are produced. Based on these CT images, density and/or atomic maps of the cargo can be produced. The CT images, the density and/or atomic number images are analyzed to infer the presence of contraband such as explosives, special nuclear and shielding materials, and/or to verify information listed in one or more cargo manifests.

XRD-Based Threat Detection System

Figure 2:
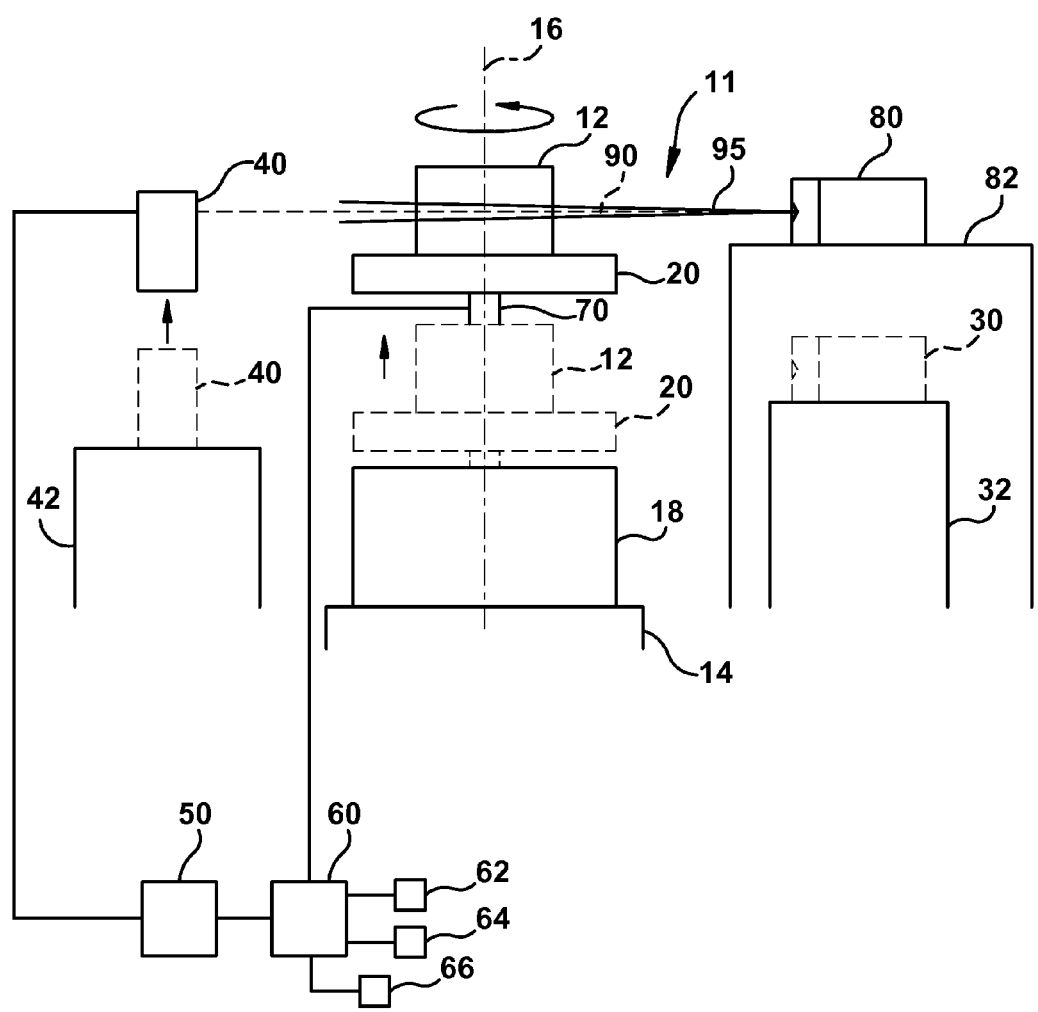
FIG. 2 is a schematic illustration of an embodiment of a second threat detection system.

FIG. 2 is a schematic illustration of an embodiment of a second threat detection system 11. In one example, the second threat detection system 11 is a XRD-based threat detection system. Much of FIG. 2 is identical to FIG. 1. For example, descriptions of the vertical axis 16, horizontal axis 90, and the components 18, 32, 42, 50, 60, 62, 64, 66, and 70 that appear in FIG. 2 were provided above, and are not repeated here.

The second threat detection system 11 includes a second radiation source 80 supported by a frame 82. In one example, the second radiation source 80 is a XRD radiation source. When combined with the first threat detection system 10, as shown in the example illustrated in FIG. 2, it can be seen that the platform 20 can be moved by the actuator 70 to bring a suspicious area of the object 12, which was previously identified by the first (CT-based) threat detection system 10, into alignment with a primary beam aperture of the second radiation source 80. It can also be seen that the detector 40 can be moved relative to the second radiation source 80.

As illustrated in FIG. 2, the first threat detection system 10 and the second threat detection system 11 may be combined into a single integrated threat detection system. Alternative configurations of the first threat detection system 10 and the second threat detection system 11 are contemplated wherein each of the first and second systems 10, 11 stand alone from each other. If formed as stand-alone systems, each threat detection system 10, 11 may be configured to receive, analyze, and/or operate using scan and/or image data obtained by the other.

XRD-Based Resolution of False Alarms

Figure 3:
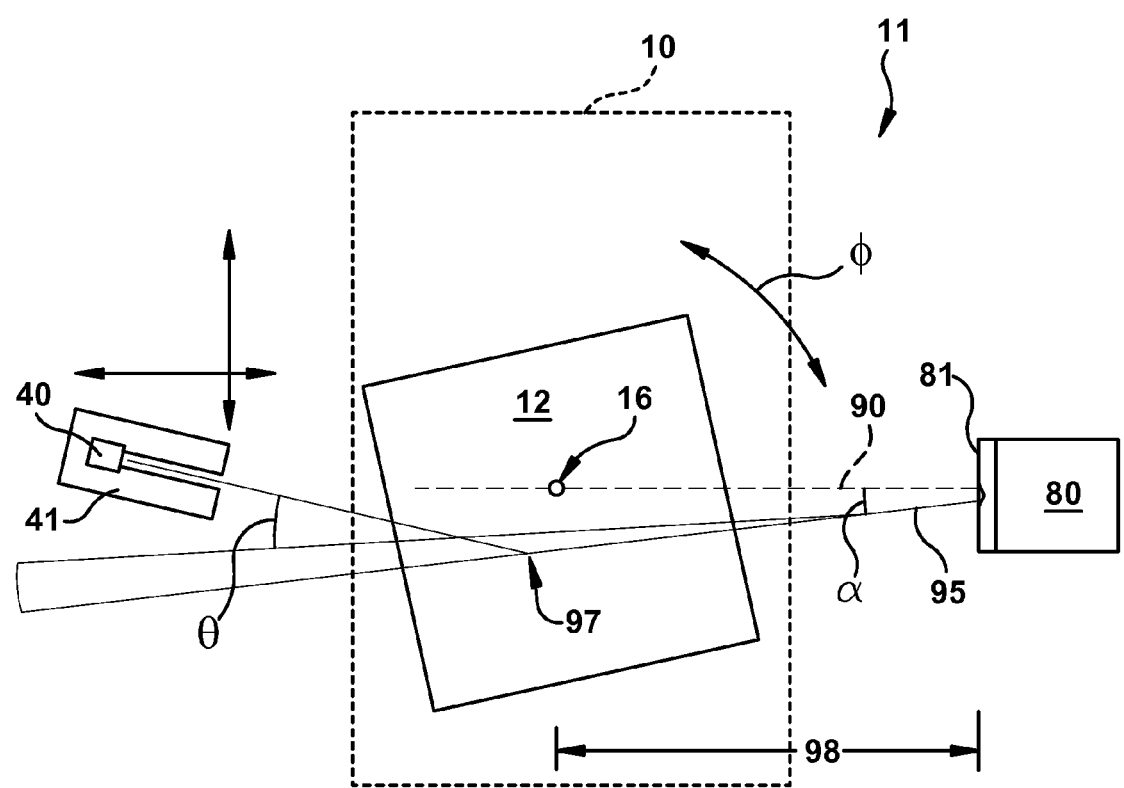
FIG. 3 is another schematic illustration of an embodiment of the second threat detection system of FIG. 2.

FIG. 3 is a top-view, schematic illustration of the embodiment of the second threat detection system 11 of FIG. 2, where the first threat detection system 10 is indicated by a dashed rectangle. In the example illustrated in FIG. 3, the object 12 is positioned between the second radiation source 80 and the detector 40, and, it is rotatable at a rotation angle $\Phi$ about the vertical axis 16. The radiation beam 95, illustrated in this example as a cone beam, forms a ray angle $\alpha$ with the horizontal axis 90. The radiation source 80 may include an adjustable diaphragm 81. The detector 40 may include collimator/shielding 41. A suspicious area 97, also called an "alarm region," may be identified in the object 12 along the ray path at a distance 98, measured in one or more dimensions, from the second radiation source 80.

Detectors of the type that are suitable for use as the detector 40 include, but are not limited to, spectroscopic photon counting detectors, such as, a hyper-pure Ge detector or a room-temperature semi-conductor such as $HgI_2$ or CdTe. In the present example, the detector 40 is focused at a small angle of scatter θ. The scatter angle θ may range from about 0.05 radians to about 0.01 radians relative to the suspicious area 97. It is believed that the small angle of scatter is beneficial because it secures an accurate measurement of an XRD profile over a momentum region of about, and including, 1 $nm^{-1}$, where the Bragg peaks of significance for material analysis are situated. Although only one detector 40 is illustrated in FIG. 3, it is contemplated that other embodiments of secondary threat detection system 11 may include one or more detectors that are placed at fixed angles relative to one or more of the vertical axis 16 and the horizontal axis 90.

Exemplary radiation sources that are suited for use as the second radiation source 80 in the secondary threat detection system 11 include, but are not limited to, a linac XD-ray source, a DC electron impact bremsstrahlung source, and a liquid metal anode X-ray source, among many others. Advantages of using a liquid metal anode X-ray source as compared to a linac XD-ray source are believed to include: a more compact radiation shield, simpler collimation elements, and reduced detector cross-talk.

At the time of this filing, the highest energy, commercially available DC electron impact bremsstrahlung source operate at a potential of about 850 KV. However, other X-ray sources operating at even higher voltages, i.e., up to and including about 8 MeV, such as linacs, betatrons, and the like, may also be used as the second radiation source 80, provided arrangements are made to compensate for, or eliminate, dead time problems in the detector 40 that are caused by concentrated bunches of photons emitted in short pulse times on the order of about 5 μs.

It is noted that the first radiation source 30 that is used in the first threat detection system 10, may be different from the second radiation source 80 that is used in the XRD-based threat detection system 11. This is because of the pulsing and large focal spot of the CT-based threat detection system 10 and because the higher energy of the first radiation source 30 reduces the observation angle(s). If a different second radiation source 80 is used, it is preferable, but not necessary, that it is positioned on the side of, or above, or below, the first radiation source 30. In one example, the second radiation source 80 is positioned relative to the first radiation source 30 to maintain or decrease the translational range requirement.

Discussing the operation and coordination of the first and second threat detection systems 10, 11 in more detail, following analysis of the CT images that are generated by the first threat detection system 10, at least one of a user (not shown), the data collection system 50, and the computer processor 60, can identify one or more suspicious areas (, e.g., area 97 of FIG. 3). These may be called "alarm areas," "alarms," or "alarm objects." In one example, the suspicious areas are identified and subject to a more detailed scan. This is typically performed by the second threat detection system 11. As discussed above, a non-limiting example of the second threat detection system 11 is a XRD-based threat detection system.

In an exemplary operating scenario of the first threat detection system 10 and the second threat detection system 11, the second threat detection system 11 is configured to receive, or use, all or part of the scan and/or image data, and/or other information, obtained by the first threat detection system 10. The scan and/or image data obtained by the first threat detection system 10, and received and/or used by the second threat detection system 11, may be one-dimensional or multi-dimensional, e.g., two-dimensional ("2-D"), three-dimensional ("3-D"), and so forth. It may be used to determine a minimal X-ray attenuation path that is subsequently used to perform a XRD-based scan of the one or more selected suspicious areas of the object 12.

In another exemplary operational example, when the first threat detection system 10 raises an alarm, i.e., identifies one or more suspicious areas in the object 12, it may exchange various data with the second threat detection system 11. These data may include, but are not limited to:

(a) a single or multi-dimensional geometrical position of the suspicious area in the object 12;
(b) a geometry of a ray path from the x-ray source 30,80 to the detector 40 in the horizontal plane that contains the suspicious area 97, wherein the geometry of the ray path minimizes a total X-ray attenuation;
(c) a value of an object density integrated along this ray path; and
(d) a number of suspicious areas and their spatial distribution along this ray path.

Figure 4:
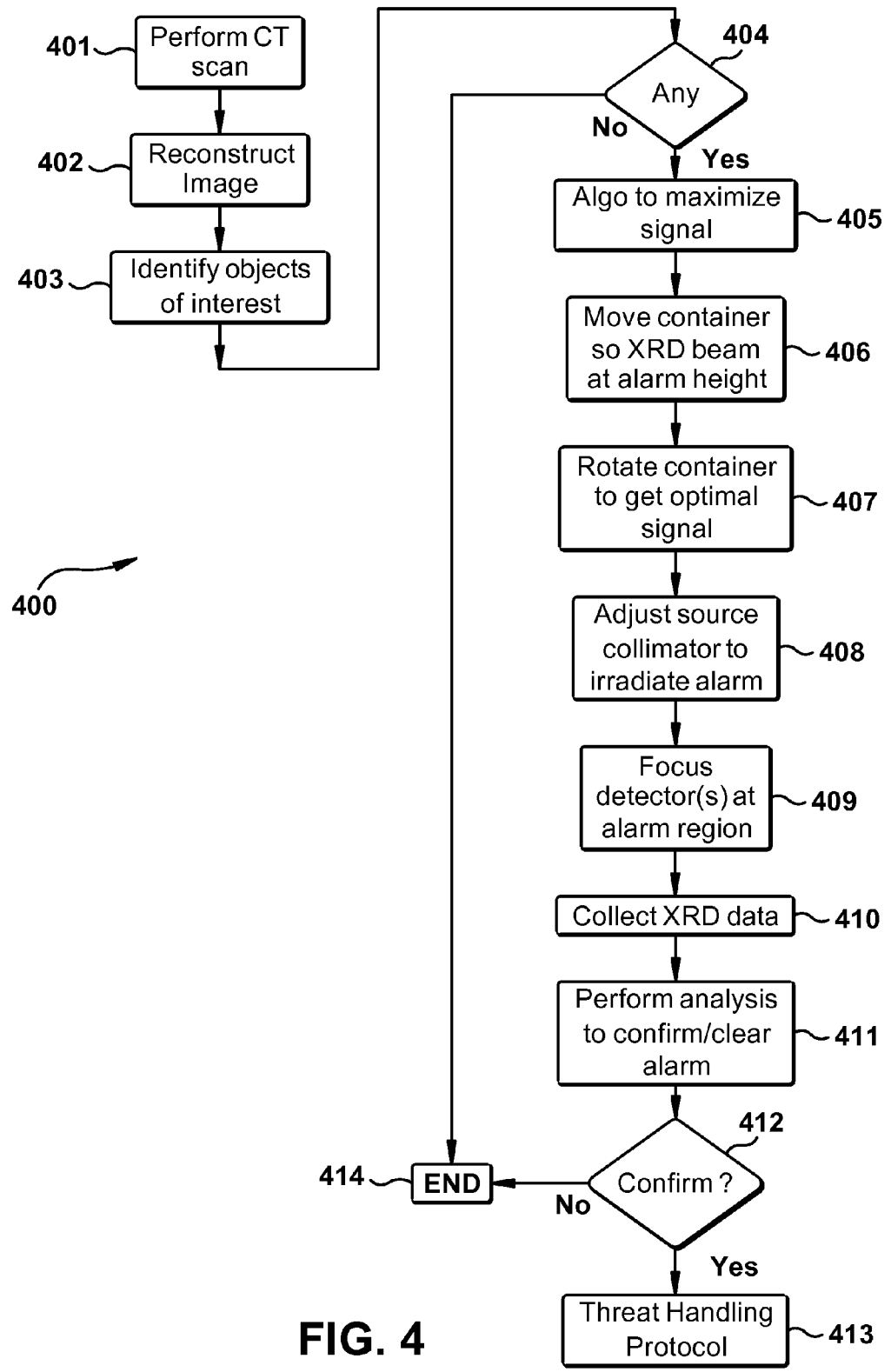
FIG. 4 is a flowchart illustrating a method of operating the second threat detection system of FIGS. 2 and 3.

FIG. 4 is a flowchart illustrating a method of operating the first threat detection system 10 and the second threat detection system 11 of FIGS. 1-3. The functional blocks of the flowchart 400 that are illustrated in FIG. 4 each represent one or more actions that may be performed by the computer processor 60 (FIG. 1-2) when the computer processor 60 executes machine-readable instructions. Unless otherwise indicated, the actions represented by the functional blocks of the flowchart 400 may be performed simultaneously or in any suitable order. The machine-readable instructions executed by the computer processor 60 may be stored in the computer-readable memory 64 (FIG. 1-2) or, in alternative embodiments, in other suitable mediums that are in communication with computer processor 60, but that may, or may not, be positioned proximate the computer processor 60

As illustrated in FIG. 4, the method 400 includes, as represented by functional block 401, performing a CT scan of the object 12, as described above. As represented by functional block 402, once the CT scan is complete, the method 400 further includes reconstructing one or more CT images. As represented by functional block 403 the method 400 further includes identifying one or more suspicious areas 97, or objects of interest (discussed in connection with objects 501, 502, 503 of FIG. 5). If it is determined that that are no suspicious areas 97 or objects of interest 501, 502, 503 that are present, the method 400 ends, as represented by functional block 414, and the object 12 may be cleared.

On the other hand, if one or more suspicious areas 97 or objects of interest 501, 502, 503 is identified, the method 400 includes, as represented by functional block 405, maximizing the signal quality using one or more pre-determined signal processing algorithms. Suitable signal processing algorithms are believed to be within the ability of a skilled artisan to create and implement without undue experimentation. Accordingly, a detailed explanation is not provided herein, except to say that the computer processor 60 may be configured to identify, for all possible rays intersecting the suspicious area 97 in the horizontal measurement plane, a single ray path that minimizes the total X-ray attenuation. This is accomplished, in one example, by using the 3-D distribution of attenuation coefficient data that are reconstructed following the CT scan. Generally, however, the ray path that minimizes the total attenuation is defined by an angular position of the object 12 (e.g., the rotation angle, or projection angle, Φ), and by an angular coordinate of the primary ray beam from the second radiation source 80, i.e., by the ray angle α. To select the X-ray beam from the source having the ray angle α, the adjustable diaphragm(s) 81 may be moved.

Referring again to FIG. 4, the method 400 may further include, as represented by the functional block 406, moving the object 12 on the platform 20 to a vertical position at which the suspicious area 97 is in the measurement plane of the second radiation source 80. As represented by the functional blocks 407, the method 400 may further include rotating the object 12 to obtain an optimal signal-to-noise ratio. As represented by the functional block 408, the method may further include adjusting the second radiation source 80 to irradiate the suspicious area 97. As represented by the functional block 409, the method may further include focusing the detector(s) 40 at the suspicious area 97. The actions represented by each of the functional blocks 407, 408, and 409 may include aligning a second radiation source 80 and the suspicious area 97 along the ray path, determined at functional block 405, to minimize a total X-ray attenuation.

As represented by the functional block 410, the method 400 may include collecting XRD data from the irradiated suspicious area 97. As represented by the functional block 411, the method may further include performing analysis to confirm or clear the alarm.

As represented by the functional block 412, the method 400 may include making a decision. For example, if the alarm is cleared, i.e., determined to be false, the method 400 may end. On the other hand, if the alarm is confirmed, i.e., determined to be accurate, the method 400 may further include executing a pre-determined threat-handling protocol, as represented by the functional block 413.

Figure 5:
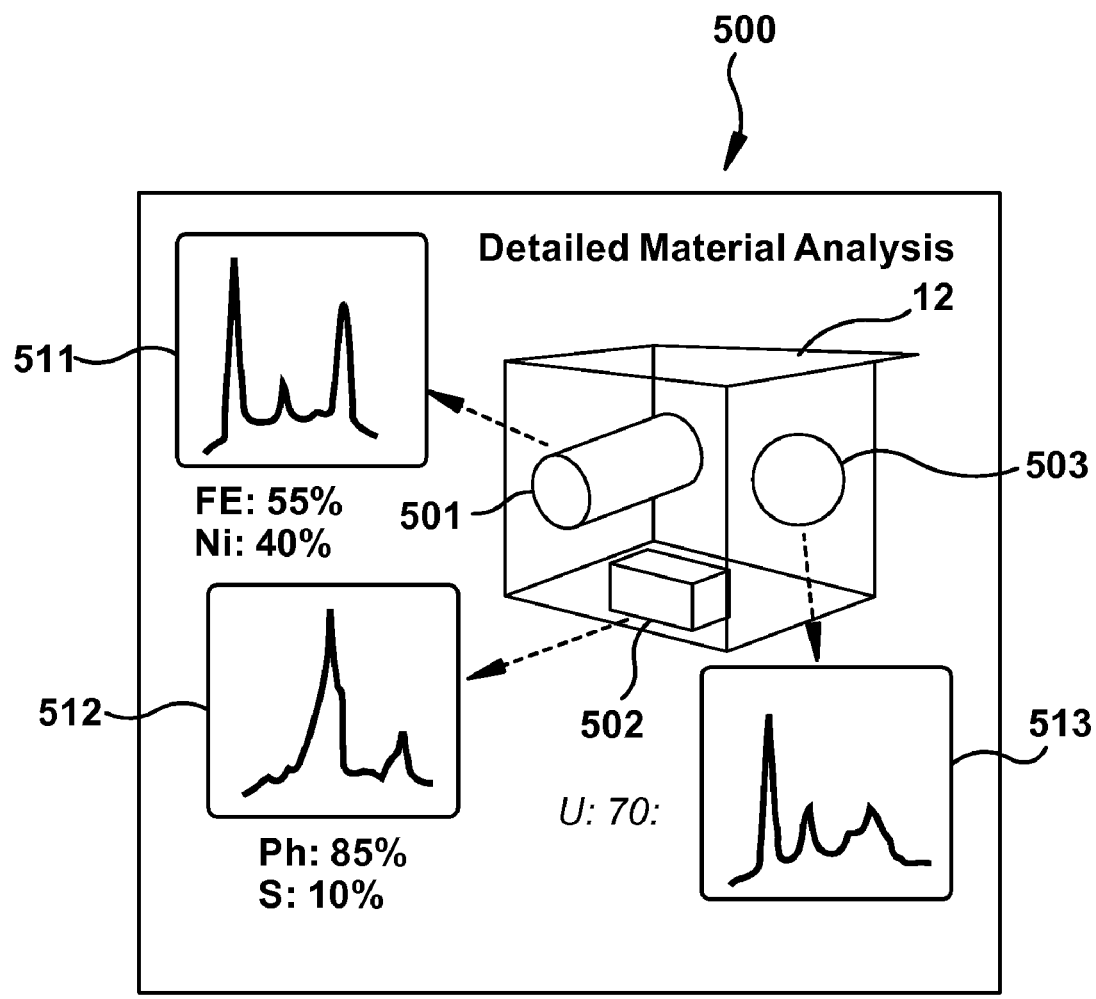
FIG. 5 is a diagram illustrating how detailed material analysis may be performed using a XRD-based threat detection system to detect one or more HDMs.

Referring next to FIG. 5, and also to FIGS. 1-3, a diagram 500 is shown that illustrates an example of the material analysis that is performed using a XRD-based threat detection system to detect one or more high density materials ("HDMs"). In the diagram 500, three objects of interest 501, 502, 503 are identified in the object 12 by a first CT-based threat detection system 10. Thereafter, interrogation and analysis of each object of interest 501, 502, 503 by a second XRD-based threat detection system 11 produces one or more of the respective diffraction profiles 511, 512, and 513. These profiles, preferably, identify the materials and compositions of materials that comprise each object of interest 501, 502, 503. For example, examining the objects of interest 501, 502, 503 in more detail, it was determined that it comprises 55% FE and 40% Ni; object of interest 502 comprise 85% Pb and 10% S; and object of interest 503 comprises 70% U.

Embodiments of the systems discussed herein consider as a basis for performing the XRD-based resolution of false alarms that the atomic coherent scatter cross section scales as $Z^2$, thus enhancing the signal from high Z elements; whereas uranium and plutonium, alone among all high density metals, have non-cubic crystal structures. Their XRD patterns differ greatly from those of other high Z metals such as lead, which have cubic crystal structures. It is believed that expected measurement parameters, such as XRD signals, spatial resolutions, photon fluxes and measurement time can be performed by a skilled artisan without undue experimentation.

Secondary Collimator

In addition to the "single-point" detection system described above, a multi-point, multi-angle detection system has been invented for XRD-based resolution of false alarms. The multi-point, multi-angle detection system has the advantages of recording diffraction profiles from all voxels irradiated by the primary beam simultaneously (multi-point), and also of recording diffraction profiles simultaneously at several discrete angles (multi-angle) thus extending the momentum range over which a XRD profile is measured. This is beneficial because the resulting XRD profile benefits from improved signal-to-noise ratio, which increases accuracy of detection and reduces false alarms.

Figure 6:
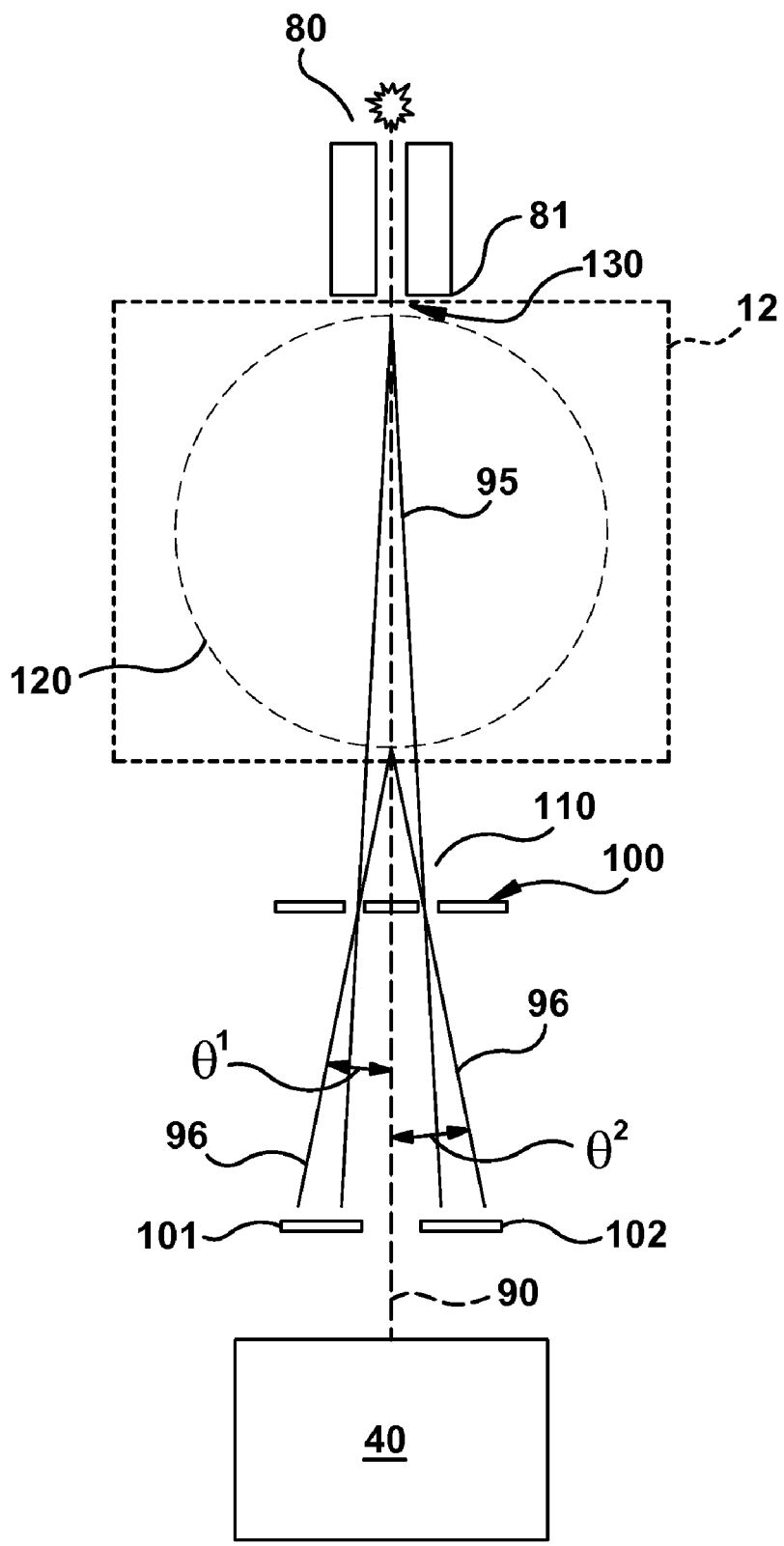
FIG. 6 is a schematic illustration of an improved XRD-based threat detection system that includes multiple X-ray detectors and an embodiment of an improved secondary collimator.

FIG. 6 is a schematic illustration of an example of an improved XRD-based threat detection system 11 that includes multiple X-ray detectors 40, 101, 102 and a secondary collimator 100 having one or more slit apertures 110 formed therein. The secondary collimator 100 is positioned between the second radiation source 80 and the detector 40. Of course, other examples of the threat detection system 11 may include a secondary collimator 100 that is positioned in a manner other than between the second radiation source 80 and the detector 40 such that it can receive the radiation before it is received by the detector 40.

In the present example, multiple scatter detectors 101, 102 are positioned between the secondary collimator 100 and the detector 40. For simplicity, the proposed collimation scheme is shown in FIG. 6 with only two detector systems, i.e., detector 40 and the multiple scatter detectors 101, 102. Of course, many more detectors are possible. Here, each of the multiple scatter detectors 101, 102 are disposed at predetermined scatter angles $\theta^1$ and $\theta^2$, respectively, with respect to the axis 90, to capture photons scattered from a scan area 120 along ray paths 96, which pass through the secondary collimator's one or more slit apertures 110. The scan area 120 may include all or part of a suspicious area 97. It may be desirable that the suspicious area is identified by a previous CT scan of the object 12. Also, various implementations of the XRD-based threat detection system 11 may position the object 12 and/or the scan area 120 between the secondary collimator 100 and the second radiation source 80.

Referring briefly to FIG. 3, and also FIG. 6, a primary aperture 130 is formed in the adjustable diaphragm 81. This aperture 130 is positioned between the second radiation source 80 and the object 12. A cone-shaped beam, or other shaped beam, of X-ray radiation 95 is emitted from the second radiation source 80 and transmitted through the scanning area 120 of the object 12. After traversing the scanning area 120, the beam of X-ray radiation 95 passes through the one or more slit apertures 110 of the secondary collimator 100. A first portion of the beam of X-ray radiation 95 impinges the detector 40; other portions of the beam of X-ray radiation 95 scatter along ray paths 96 to impinge the multiple scatter detectors 101, 102.

Describing the operation of the secondary collimator 100 when used in connection with the threat detection system 11, x-rays 95 scattered at a small angle from the front of the object 12, nearest to the second radiation source 80, impinge on a slit aperture 110 of the secondary collimator 100, which is formed of a material having a high atomic number, Z, such as lead. Those rays 95 that pass through the slit opening are incident on a pixilated detector 40. In one example, the pixels have dimensions on the order of about 250 microns. The relative positions of the detector 40 and the secondary collimator 100 and the second radiation source 80 define the axis 90, which intersects the primary beam 95 at the origin coordinate of the scatter event.

The multiple scatter detectors 101, 102 record scatter from slightly different positions along the primary beam 95. Hence an array of scatter detectors 101, 102 that is large enough to encompass all the scatter rays 96 from the object 12 will measure scattering from a complete line of volume elements (voxels) simultaneously. This is a big advantage over the single detector system, since it is no longer necessary to move the detector to the correct position. Instead, when there are several suspicious areas 97 in the object 12; they can all be resolved simultaneously.

Referring still to FIG. 6, rays 96 from different voxels along the primary beam 95 have slightly different angles of scatter. The scatter angle, θ, is obtained from simple geometry as in the following Equation 1:

Equation 1

$$\theta_i = \tan^{-1}\left(\frac{a_i}{S - x_v}\right) \quad (1)$$

where, $a_i$ is the distance of the ith secondary collimator slit from the primary beam (x) axis; S is the position (x coordinate) of the secondary collimator referred to the x-ray source and $x_v$ is the x coordinate of the voxel in which scattering originates.

Figure 7:
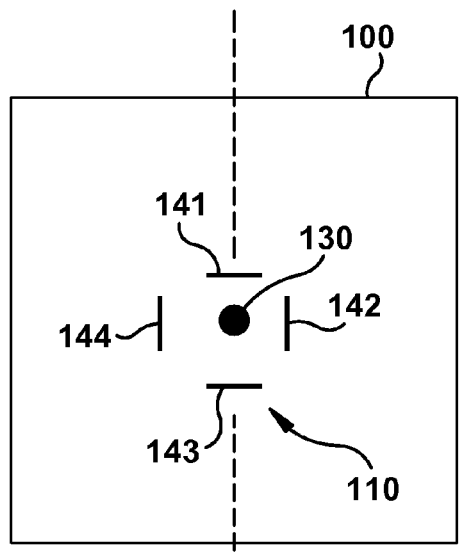
FIG. 7 is a top view of an embodiment of the improved secondary collimator of FIG. 6.

FIG. 7 is a top view of an example of a secondary collimator, such as the secondary collimator 100 of FIG. 6. FIG. 7 illustrates multiple slit apertures 110 formed in a single secondary collimator 100 and arranged at different distances from a primary beam aperture/axis 130. In this example of the secondary collimator 100, the multiple slit apertures 110 include: a first slit aperture 141, a second slit aperture 142, a third slit aperture 143, and a fourth slit aperture 144. The first slit aperture 141 is arranged closest to the primary beam aperture 130. The first slit aperture 141 is also orthogonal to the second slit aperture 142, parallel to the third slit aperture 143, and orthogonal to the fourth slit aperture 144. The second slit aperture 142 is arranged further from the primary beam aperture/axis 130 than the first slit aperture 141. The third slit aperture 143 is arranged further from the primary beam aperture/axis 130 than the second slit aperture 142. Additionally, the fourth slit aperture is arranged further from the primary beam aperture/axis 130 than the third slit aperture 143.

Figure 8:
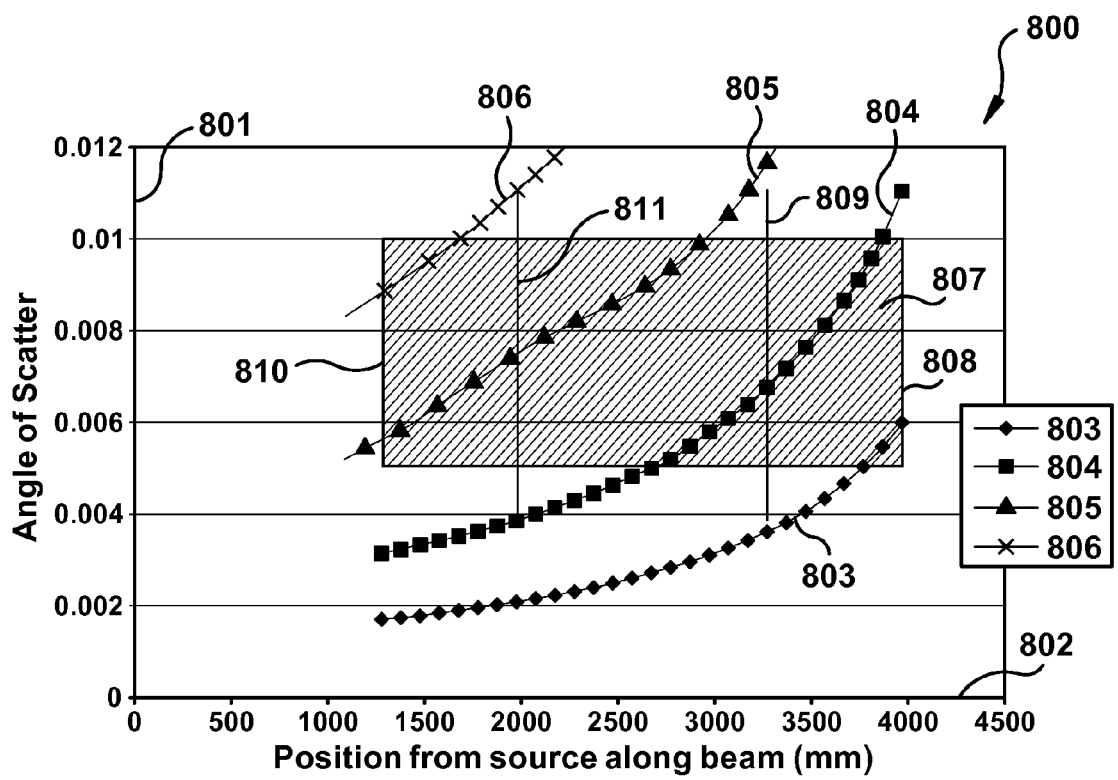
FIG. 8 is a graph that plots angles of scatter versus position from a radiation source along an X-ray beam for each of the four slit apertures illustratively shown in FIG. 7.

FIG. 8 is a graph 800 that plots angles of scatter 801 versus position 802 from a radiation source along an X-ray beam for each of the four slit apertures 141, 142, 143, 144 illustratively shown in FIG. 7. In this example, the value of α can be plotted from Equation 1 as a function of the x coordinate of the voxel position for each slit aperture 141, 142, 143, 144 in the secondary collimator.

The graph 800 plots the curves 803, 804, 805, and 806 of θ for the secondary collimator 100 comprising 4 slits, $1 \leq i \leq 4$, in FIG. 7. The lowest curve 803 is related to the first slit aperture 141 that is nearest to the x axis. Similarly the next lowest curve 804 is related to the second slit aperture 142. The next lowest curve 805 is related to the third slit aperture 143. The highest curve 806 is related to the fourth slit aperture 144.

The shaded region 807 in the graph 800 represents the range of angles (vertical scale) and the range of positions along the primary beam (horizontal scale) for which measurements are required. For each position along the primary beam 95 (FIG. 7) there are two curves that provide measurements near to the smallest and largest angles required. For example, in this non-limiting example, the curves 803 and 804 cover the x region from the end 808 of the object 12, at 4000 mm from the second radiation source 80 to the vertical line 809 at 3300 mm. The other end 810 of the object 12 is located about 1200 mm from the second radiation source 80. Another vertical line 811 is positioned at about 2000 mm. In like manner, curves 804 and 805 span the region between the two vertical lines 809 and 811. Additionally, curves 805 and 806 span the region from the second vertical line 811 to the end 810 of the object 12.

There is a further relationship between the photon energy, E, the angle of scatter, θ, and the momentum transfer, x, as given in the following equation:

Equation 2

$$x_i = \frac{E \cdot \sin\left(\frac{\theta_i}{2}\right)}{1.24} \quad (2)$$

where x is in inverse nanometers when E is expressed in keV.

Referring back to FIGS. 6 and 7, considering any predetermined voxel irradiated by the primary X-ray beam 95, it can scatter into the four secondary collimator slits apertures 141, 142, 143, 144 at four distinct angles of scatter, $\theta_1$, $\theta_2$, $\theta_3$, $\theta_4$. Hence, from Equation 2, it provides simultaneously the XRD intensity at four values of momentum, x. This feature can be used either to increase the signal-to-noise ratio in the measurement, or it can be used to extend the range of momenta values corresponding to a certain photon energy, E. Owing to attenuation effects, only the high energy photons will have appreciable transmission through the container. The multi-angle capability extends the range of momenta for which XRD intensities are measured from a certain range of photon energies. The four narrow bands of XRD intensities over the four different momenta ranges can be synthesized to give a single, broadband.

These principles can be illustrated in the following exemplary and non-limiting way. Assume that an x-ray source having a tip energy of 800 keV is available. Assume further that only the top 250 keV energy band gives useful XRD signal, as the lower energy photons are too strongly absorbed in the container. Finally assume that the highest momentum for which measurements are to be made is 2 $nm^{-1}$.

If measurements were made at only a single angle, only the momenta range from 2 $nm^{-1}$ to 1.375 $nm^{-1}$ could be covered. When four angles are available in the ratios 1, (1.375/2), $(1.375/2)^2$ and $(1.375/2)^3$, these ranges increase to: 2 $nm^{-1}$ to 1.375 $nm^{-1}$; 1.375 $nm^{-1}$ to 0.95 $nm^{-1}$; 0.95 $nm^{-1}$ to 0.65 $nm^{-1}$; and 0.65 $nm^{-1}$ to 0.45 $nm^{-1}$. Hence, in this particular, non-limiting example, a total range from about 2 $nm^{-1}$ down to about 0.45 $nm^{-1}$ can be covered. Naturally, this example is provided merely for enablement purposes and to illustrate the scientific and mathematical principles that support embodiments of the invention; accordingly, this example and the numerical values used should not be construed to limit the scope of the appended claims unnecessarily. Instead, it is contemplated that the concepts of the present invention, the scope of the disclosure, and breadth of the appended claims, cover any and all applicable numerical values and/or ranges of values that may be associated with embodiments of the invention, or equivalents thereof.

Figure 9:
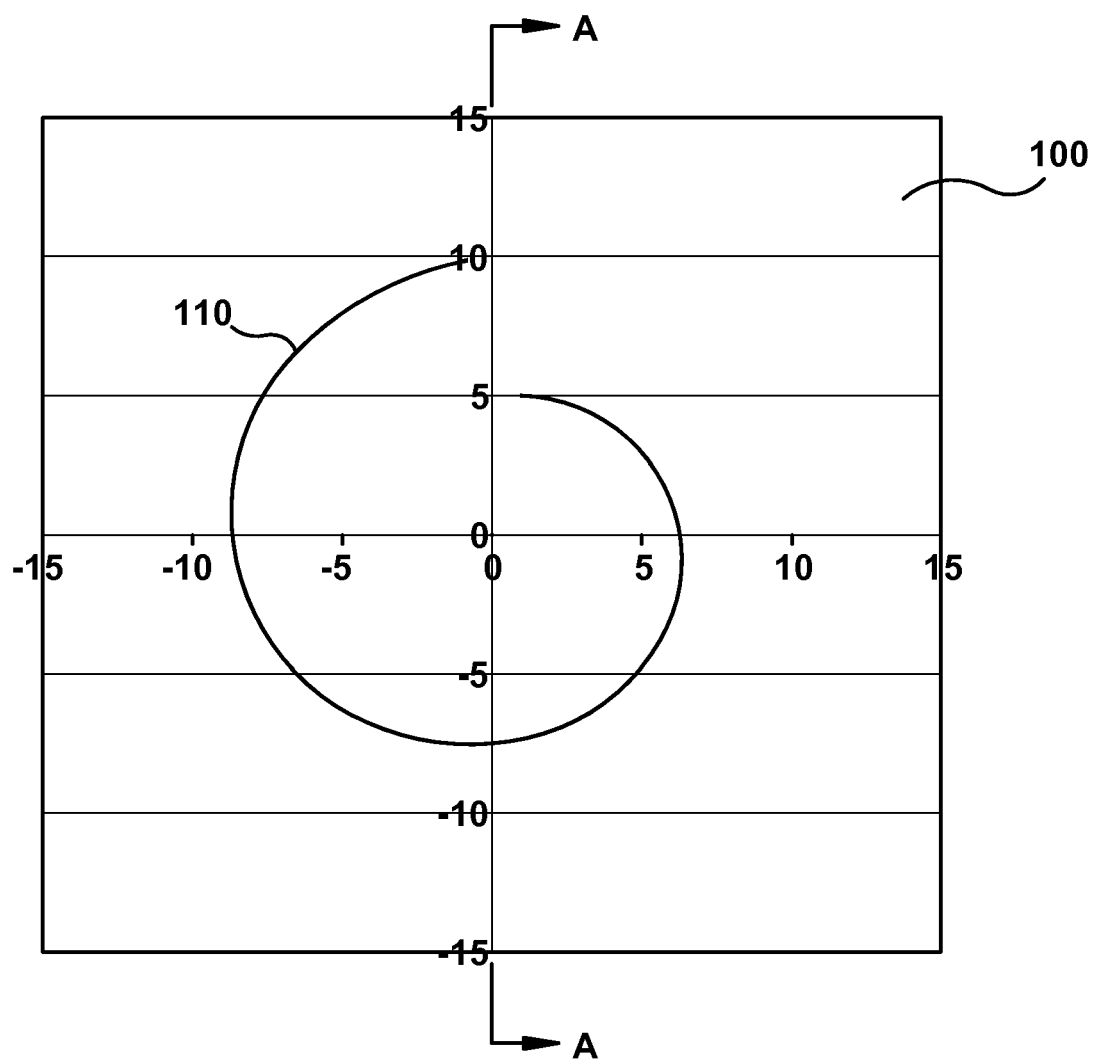
FIG. 9 is a top view of another embodiment of the secondary collimator of FIG. 6, which includes a continuous spiral aperture.

FIG. 9 is a top view of another example of a secondary collimator, such as the secondary collimator 100 of FIG. 6. Here, secondary collimator 100 includes a continuous spiral aperture 110. The principles that are discussed above can be extended to create a secondary multi-point, multi-angular collimator of continuous form as shown in FIG. 9. Consider scatter from a certain voxel as it scatters into the spirally-increasing azimuthal angle (clockwise round the spiral). Many more values of scatter angle α than the four described above with respect to FIG. 7 now become available. XRD profiles over a limited energy range can be superimposed on one another to derive a XRD profile over an extended momentum range.

In FIG. 9, the horizontal and vertical scales of the secondary collimator 100 shown are in mm and correspond to the case of a radiation source-collimator distance of about 5 m combined with a photon energy of about 500 keV.

As may be inferred from the above description, the multi-angle capability of the secondary collimator 100 causes each ray scattered from a certain voxel to vary in scatter angle around the continuous spiral slit aperture 110.

The multi-point capability of the secondary collimator 100 results because a 2-D pixilated detector is located behind the secondary collimator, as shown in FIG. 6, and the rays from different voxels along the primary beam 95 at one value of azimuthal angle are incident on the detector at different values of its radial coordinate (referred to the primary beam axis).

Figure 10:
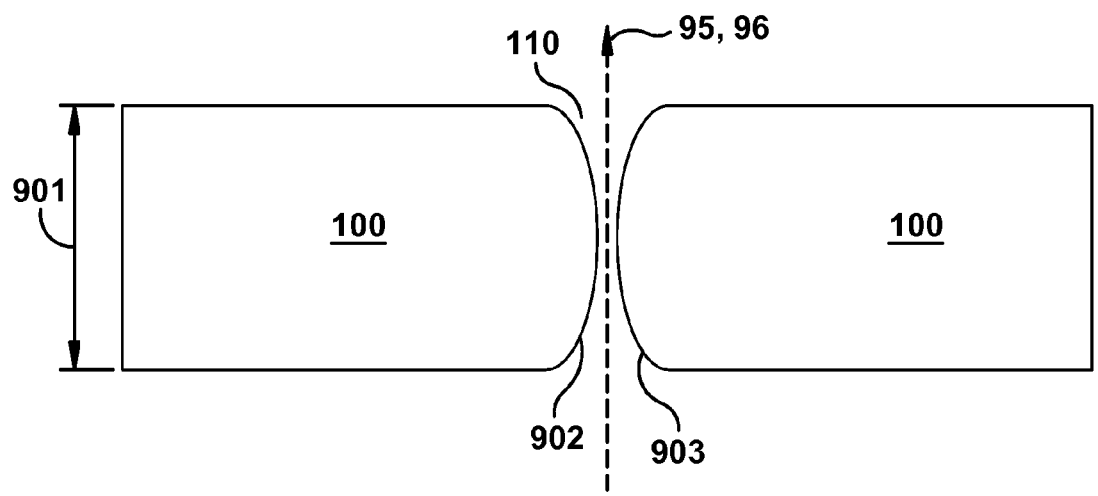
FIG. 10 is a side view, taken along the line A-A' in FIG. 9, of a portion of the continuous spiral aperture.

FIG. 10 is a side view, taken along the line A-A' in FIG. 9, of a portion of the continuous spiral aperture 110. At the very high photon energies that are envisaged for XRD of objects 12 (FIG. 6), the diffraction patterns can only be measured at very small angles of scatter, such as, for example, about $7 \times 10^{-3}$ radians. This means that all collimating elements have apertures 110 of sub mm dimensions. At the same time, the collimating elements 110 have to have thicknesses corresponding to tens of mm of a high Z material to give useful absorption of unwanted radiation. A depth profile of a secondary collimator 100 envisaged for this invention is shown in FIG. 10. The body of the secondary collimator 100 may be manufactured by casting a material of high atomic number ("Z"). A non-limiting example of such a material is lead.

In one example, a thickness 901 of the secondary collimator 100 is approximately 20 mm. The opposite faces 902, 903 of the secondary collimator slit aperture(s) 110 are rounded. This rounded form reduces X-ray scattering from the faces of the slit aperture(s) 110 that are irradiated by a primary beam of radiation.

The collimation schemes described herein have good attenuation at the high photon energies required for screening of objects, such as but not limited to, shipping containers, while demonstrating high angular resolution.

Examples of the secondary collimator 100 described above, with respect to FIGS. 6, 7, 8, 9, and 10 are mechanically easy to manufacture while having the very high angular resolution needed to measure X-ray diffraction profiles using photons of very high energy (sub MeV). Moreover, such examples of the secondary collimator 100 enable a plurality of voxels (multi-point) along the primary beam 95 to be investigated simultaneously, whereas a single-point XRD-based threat detection system can analyze only one voxel. Additionally, the multi-angle capability of embodiments of the second detection system 11 allows XRD profiles to be measured from a predetermined energy band of photons over a wider range of momenta than is possible with just a single angle. This increases the scatter photon flux.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. For example, although embodiments of the invention have been described with reference to X-ray sources and X-ray detectors, other types of radiation may be used. Other embodiments will occur to those skilled in the art and are within the scope of the following claims Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A threat detection system for identifying the contents of an object, comprising:
   a base defining an axis;
   a frame moveably coupled to the base, the frame moveable with respect to the base in a direction parallel to the axis;
   a platform configured to support the object, the platform moveably coupled to the frame, the platform moveable with the frame and rotatable with respect to the frame about the axis;
   a first radiation source fixedly positioned with respect to the platform, the first radiation source configured to transmit radiation through the object;
   a second radiation source positioned with respect to the platform so as to transmit radiation through the object; and
   a first detector moveably positioned with respect to the second radiation source, the detector configured to detect radiation transmitted through the object from at least the second radiation source and to generate a signal representative of the detected radiation.

2. A threat detection system according to claim 1, wherein the first radiation source is a computed tomography ("CT") radiation source and the second radiation source is an x-ray diffraction ("XRD") radiation source.

3. A threat detection system according to claim 2, further comprising an adjustable diaphragm disposed between the second radiation source and the object, the adjustable diaphragm forming a primary beam aperture having a primary beam axis.

4. A threat detection system according to claim 3, further comprising:
a secondary collimator positioned to receive the radiation transmitted through the object from the second radiation source; and
one or more scatter detectors positioned to capture radiation that passes through the secondary collimator.

5. A threat detection system according to claim 4, wherein the secondary collimator includes a continuous spiral aperture.

6. A threat detection system according to claim 4, wherein the secondary collimator includes a plurality of slit apertures disposed radially around the primary beam axis.

7. A threat detection system according to claim 6, wherein the plurality of slit apertures includes at least one slit aperture that is located at a distance from the primary beam axis that is different from the other apertures.

8. A multi-point, multi-angle, detection system, comprising:
a base;
an actuator in communication with the base and having one or more of a vertical movement, a horizontal movement, and a rotational movement;
a platform coupled to the actuator;
an x-ray diffraction ("XRD") radiation source fixedly positioned with respect to the base, the XRD radiation source transmitting a beam of radiation;
an adjustable diaphragm positioned to receive the beam of radiation from the XRD radiation source, the adjustable diaphragm forming a primary beam aperture having a primary beam axis;
a secondary collimator positioned to receive the radiation transmitted through the object from the XRD radiation source; and
at least one detector configured to detect radiation transmitted through the secondary collimator and to generate a signal representative of the detected radiation.

9. A system according to claim 8, wherein the secondary collimator includes at least one slit aperture that causes one or more momenta values, the one or more momenta values determined in accordance with the equation, $$x_i = \frac{E \cdot \sin\left(\frac{\theta_i}{2}\right)}{1.24},$$

where x is the momenta value, E is the photon energy, and θ is a scatter angle of the radiation transmitted through the secondary collimator.

10. A system according to claim 9, wherein the momenta values are in a range from about 0.4 $nm^{-1}$ to about 2 $nm^{-1}$.

11. A system according to claim 9, wherein the at least one slit aperture includes a first aperture, a second aperture that is orthogonal to the first aperture, a third aperture that is parallel and opposite to the first aperture, and a fourth aperture that is parallel and opposite to the second aperture.

12. A system according to claim 9, wherein the plurality of slit apertures includes at least one slit aperture that is located at a distance from the primary beam axis that is different from the other apertures.

13. A system according to claim 9, wherein the at least one slit aperture includes a continuous spiral aperture.

14. A method of scanning the contents of an object with a threat detection system, said method comprising:
performing a computed tomography ("CT") scan of the object;
reconstructing an image from data collected from the CT scan;
identifying a suspicious area of the object using the image;
moving the suspicious area of the object to a measurement plane of a second radiation source; and
adjusting the second radiation source to irradiate the suspicious area.

15. A method according to claim 14, further comprising:
collecting data by irradiating the suspicious area;
determining a ray path by maximizing a signal quality using one or more pre-determined signal processing algorithms; and
aligning the suspicious area and the second radiation source along the ray path.

16. A method according to claim 15, further comprising selecting an X-ray beam from the second radiation source by moving an adjustable diaphragm, the adjustable diaphragm including a primary beam aperture having a primary beam axis.

17. A method according to claim 16, further comprising:
focusing a detector at the suspicious area; and
collecting data of the suspicious area using the detector.

18. A method according to claim 17, wherein the threat detection system includes a secondary collimator that has a continuous spiral slit that causes a plurality of scatter angles θ of scattered radiation.

19. A method according to claim 18, wherein the secondary collimator includes a plurality of slit apertures disposed radially around the primary beam axis, each of the slit apertures causes a scatter angle θ of the scattered radiation.

20. A method according to claim 18, wherein the plurality of slit apertures includes a first aperture, a second aperture that is orthogonal to the first aperture, a third aperture that is parallel and opposite to the first aperture, and a fourth aperture that is parallel and opposite to the second aperture.

* * * * *